US012631999B2

(12) United States Patent

Nishikata et al.

(10) Patent No.: US 12,631,999 B2

(45) Date of Patent: May 19, 2026

(54) IMAGE FORMING APPARATUS AND NON-TRANSITORY COMPUTER READABLE MEDIUM STORING IMAGE FORMING PROGRAM

(71) Applicant: FUJIFILM Business Innovation Corp., Tokyo (JP)

(72) Inventors: Takumi Nishikata, Kanagawa (JP); Yusuke Chika, Kanagawa (JP); Eiichi Waida, Kanagawa (JP); Kazunobu Uchiyama, Kanagawa (JP); Hideo Kimura, Kanagawa (JP); Yuzo Fujita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/190,049

(22) Filed: Mar. 24, 2023

(65) Prior Publication Data

US 2024/0069480 A1 Feb. 29, 2024

(30) Foreign Application Priority Data

Aug. 31, 2022 (JP) ................................ 2022-138590

(51) Int. Cl.
*G03G 15/00* (2006.01)

(52) U.S. Cl.
CPC ..... *G03G 15/5041* (2013.01); *G03G 15/5058* (2013.01)

(58) Field of Classification Search
CPC ........... G03G 15/0189; G03G 15/5041; G03G 15/5058; G03G 15/5062
See application file for complete search history.

(56) References Cited

U.S. PATENT DOCUMENTS

2020/0310304 A1 * 10/2020 Hagiwara .......... G03G 15/5058

FOREIGN PATENT DOCUMENTS

| | | |
|---|---|---|
| JP | 3020987 | 3/2000 |
| JP | 2001066837 | 3/2001 |
| JP | 5665782 | 2/2015 |

* cited by examiner

*Primary Examiner* — Hoang X Ngo

(74) *Attorney, Agent, or Firm* — JCIPRNET

(57) ABSTRACT

An image forming apparatus includes a plural image forming units each having a plural image forming sections, and an intermediate transfer body on which toner images formed by the plural image forming sections are primarily transferred, a plural secondary transfer units that are provided corresponding to the plural image forming units, and secondarily transfer the toner images of the intermediate transfer body to a recording medium, and a processor, in which each image forming unit has the image forming section of the same color, and the processor is configured to: in response to an instruction to output a color chart of the same color, execute a mode in which the color chart of the toner image having a density of intermediate gradation, formed by the image forming section of the same color for each image forming unit, is secondarily transferred to the recording medium and output.

20 Claims, 9 Drawing Sheets

IMAGE FORMING APPARATUS AND NON-TRANSITORY COMPUTER READABLE MEDIUM STORING IMAGE FORMING PROGRAM

CROSS-REFERENCE TO RELATED APPLICATIONS

This application is based on and claims priority under 35 USC 119 from Japanese Patent Application No. 2022-138590 filed Aug. 31, 2022.

BACKGROUND

(i) Technical Field

The present invention relates to an image forming apparatus and a non-transitory computer readable medium storing an image forming program.

(ii) Related Art

JP2001-066837A discloses a technique related to an image forming apparatus used in an electrophotographic copying machine, a printer, or the like. In this related art, in controlling toner replenishment to a developer by comparing the result of density measurement of a reference patch by an optical sensor with a reference patch target value for toner replenishment control, and in controlling the image forming conditions that affect the formed image by comparing the result of density measurement of the reference patch by the optical sensor with the reference patch target value for gradation control, only the reference patch target value for toner replenishment control is changed according to the measurement result by a counter that counts the number of prints using developer.

JP3020987B discloses a technique related to a color image forming apparatus. In this related art, the color balance of the first color image forming apparatus is adjusted in order to match the color balance of the first color image forming apparatus with the color balance of the second color image forming apparatus.

JP5665782B discloses a technique related to an image forming unit that can form an image on paper, an image reading unit that can read an image output from the image forming unit, and an image forming apparatus that can calculate information of the image reading unit and execute gradation correction of the image forming unit. In the related art, there is a control unit that changes the degree of influence of the reflectance of a paper depending on the gradation and corrects the degree of influence to a predetermined gradation characteristic.

SUMMARY

In an image forming apparatus including a plurality of image forming units each having an intermediate transfer body to which a toner image formed by a plurality of image forming sections is primarily transferred, and secondarily transferring a toner image of the intermediate transfer body of the plurality of image forming units to a recording medium, in a case where the different image forming units have the image forming sections of the same color, even in a case where there is a difference between the densities of intermediate gradation of the toner images of the same color, the toner images cannot be compared.

Aspects of non-limiting embodiments of the present disclosure relate to an image forming apparatus and a non-transitory computer readable medium storing an image forming program that include a plurality of image forming units each having an intermediate transfer body to which a toner image formed by a plurality of image forming sections is primarily transferred, and secondarily transferring a toner image of the intermediate transfer body of the plurality of image forming units to a recording medium, in which the densities of intermediate gradation of toner images of the same color, formed by different image forming sections can be compared.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: a plurality of image forming units each having a plurality of image forming sections, and an intermediate transfer body on which toner images formed by the plurality of image forming sections are primarily transferred; a plurality of secondary transfer units that are provided corresponding to the plurality of image forming units, and secondarily transfer the toner images of the intermediate transfer body to a recording medium; and a processor, in which each image forming unit has the image forming section of the same color, and the processor is configured to: in response to an instruction to output a color chart of the same color, execute a mode in which the color chart of the toner image having a density of intermediate gradation, formed by the image forming section of the same color for each image forming unit is secondarily transferred to the recording medium and output.

BRIEF DESCRIPTION OF THE DRAWINGS

Exemplary embodiment(s) of the present invention will be described in detail based on the following figures, wherein.

DETAILED DESCRIPTION

Exemplary Embodiment

An image forming apparatus according to an exemplary embodiment of the present invention will be described.

Figure 1:
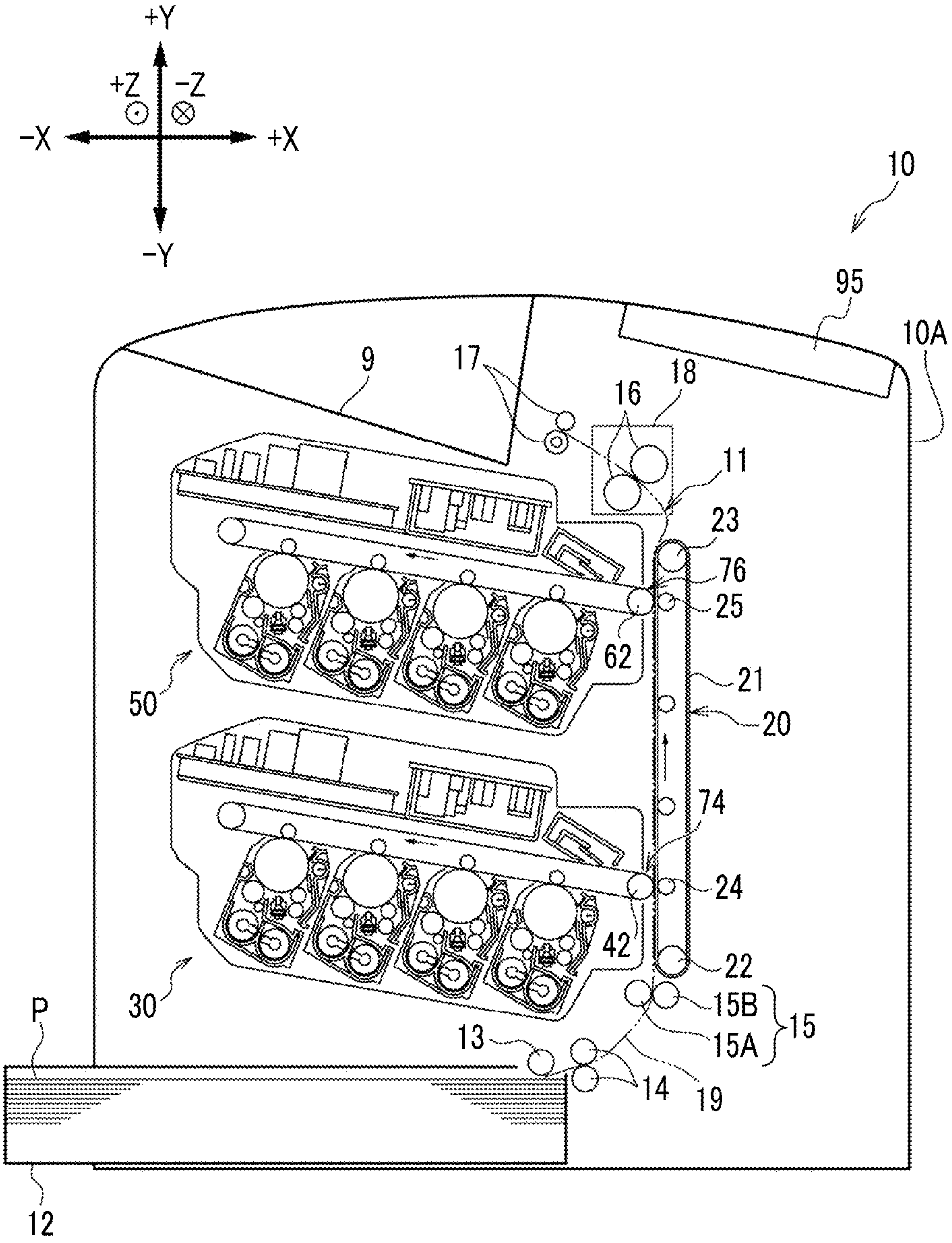
FIG. 1 is a configuration diagram of an image forming apparatus according to a first exemplary embodiment of the present invention.

In addition, the width direction of the image forming apparatus 10 shown in FIG. 1 is an X direction, the height direction is a Y direction, and the depth direction is a Z direction, which are indicated by arrows X, Y, and Z, respectively. In a case where it is necessary to distinguish one side and the other side of the X direction, the Y direction, and the Z direction, with respect to the image forming apparatus 10 shown in FIG. 1, the right side is described as the +X side, the left side is described as the −X side, and the upper side is described as the +Y side, the lower side is described as −Y side, the front side is described as +Z side, and the rear side is described as −Z side. Further, in the present exemplary embodiment, the recording paper P is adopted as an example of the recording medium, the upstream side in the conveyance direction in which the recording paper P is conveyed is defined as the "upstream side in the conveyance direction", and the downstream side in the conveyance direction is "downstream side in the conveyance direction". In addition, the image forming apparatus 10 in the present exemplary embodiment is a so-called single-pass type, and printing is performed by the recording paper P passing through the front of a first image forming unit 30 and a second image forming unit 50, which will be described later.

Overall Configuration

First, the overall configuration of the image forming apparatus will be described.

As shown in FIG. 1, the image forming apparatus 10 includes an operation panel 95, an accommodating unit 12 that accommodates recording paper P as an example of a recording medium, a conveyance unit 11 that conveys the recording paper P along a conveyance path 19, and the first image forming unit 30 and the second image forming unit 50 that form a toner image to be transferred to the recording paper P. In addition, the toner image is an image using a toner as an example of a color material such as a developer.

The accommodating unit 12 can be pulled out from the image forming apparatus main body 10A, which is the apparatus main body of the image forming apparatus 10, and accommodates the recording paper P.

The conveyance unit 11 includes a feed roll 13, a conveyance roll 14, a resist roll pair 15, a conveyor belt device 20, a fixing device 18, a discharge roll 17, and the like, in order from the upstream side in the conveyance direction.

The feed roll 13 sends out the recording paper P accommodated in the accommodating unit 12 to the conveyance path 19 configuring the conveyance unit 11. The conveyance roll 14 conveys the recording paper P along the conveyance path 19.

The resist roll pair 15 conveys the recording paper P conveyed by the conveyance roll 14 to a secondary transfer position TJ2 on the upstream side, which will be described later. In the resist roll pair 15, the pinch roll 15B rotates in a manner driven by the resist roll 15A. Then, the resist roll pair 15 sandwiches the recording paper P between the resist roll 15A and the pinch roll 15B, and conveys the recording paper P to the downstream side in the conveyance direction.

The conveyor belt device 20 conveys the recording paper P to the downstream side in the conveyance direction along the conveyance path 19 while secondarily transferring the toner image formed by the first image forming unit 30 and the second image forming unit 50 to the recording paper P. In addition, the details of the conveyor belt device 20 will be described later.

The fixing device 18 has a fixing roll pair 16, passes through the fixing roll pair 16, and heats and pressurizes the recording paper P, on which the toner image is transferred, to fix the toner image on the recording paper P.

The discharge roll 17 discharges the recording paper P on which the toner image is fixed by the fixing device 18, to the discharge unit 9.

The first image forming unit 30 and the second image forming unit 50 are disposed side by side in the vertical direction. In addition, in the present exemplary embodiment, the second image forming unit 50 is disposed above the first image forming unit 30. From another point of view, the second image forming unit 50 is disposed on the downstream side in the conveyance direction of the first image forming unit 30.

Figure 2:
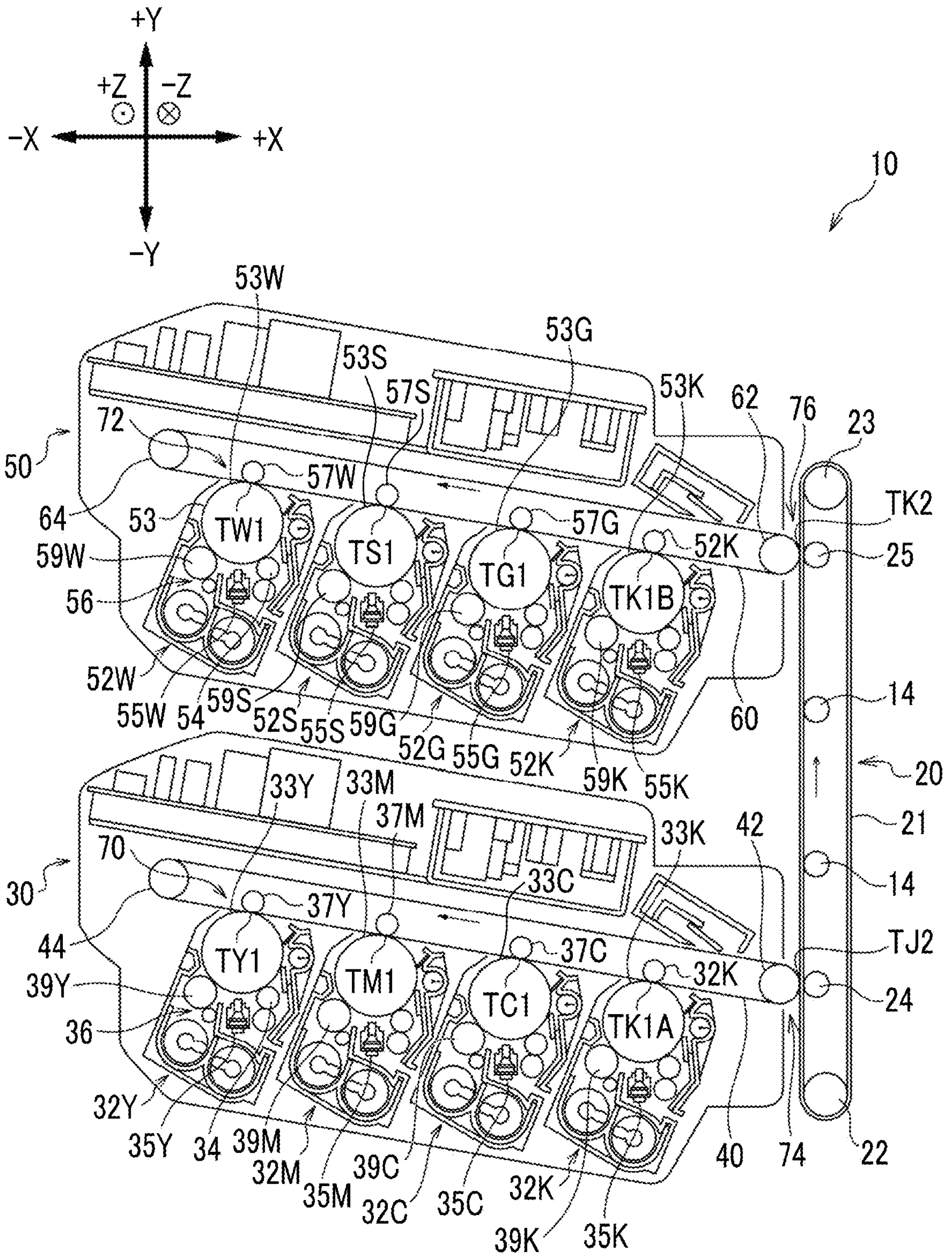
FIG. 2 is a partially enlarged view of FIG. 1.

As shown in FIG. 2, the first image forming unit 30 includes four image forming sections 32, and an endless intermediate transfer belt 40 as an example of an intermediate transfer body. The toner images formed by the four image forming sections 32 are transferred to the intermediate transfer belt 40, and the intermediate transfer belt 40 is mounted to be rotatable counterclockwise with a front view of FIG. 2.

The image forming section 32 includes an image forming section 32K that forms a black toner image of black color, an image forming section 32M that forms a magenta toner image of magenta color, an image forming section 32C that forms a cyan toner image of cyan color, and an image forming section 32Y that forms a yellow toner image of yellow color. The four image forming sections 32 are disposed in the order of the image forming section 32Y, the image forming section 32M, the image forming section 32C, and the image forming section 32K in order from the upstream side in the rotation direction (the side closer to the support roll 44 to be described later) in which the intermediate transfer belt 40 rotates. In addition, in the following, the upstream side in the rotation direction of the intermediate transfer belt 40 is referred to as "the rotation direction upstream side", and the downstream side in the rotation direction is referred to as "the rotation direction downstream side". That is, in the image forming section 32, the image forming section 32Y is disposed on the most rotation direction downstream side.

In addition, in a case where it is not necessary to distinguish between Y, M, C, and K, Y, M, C, and K are omitted.

The image forming section 32 includes a photoconductor 33, a charging member 34 that charges the surface of the photoconductor 33, an exposure device 35 that irradiates the charged photoconductor 33 with exposure light, and a developing device 36 that develops an electrostatic latent image formed by the irradiation of the exposure light to be visualized as a toner image.

Developing rolls 39Y, 39M, 39C, and 39K are provided in the developing device 36, respectively, and are applied with a developing bias by the power supply device 159 (see FIG. 3), respectively.

Further, primary transfer rolls 37Y, 37M, 37C, and 37K for transferring the toner image formed by the image forming section 32 to the intermediate transfer belt 40 are disposed at positions facing each photoconductor 33 with the intermediate transfer belt 40 interposed therebetween. The intermediate transfer belt 40 is wound around a support roll 44 that supports the intermediate transfer belt 40 and a backup roll 42 that is disposed on the secondary transfer unit 74 on the upstream side, which will be described later. In addition, the primary transfer unit 70 includes a photoconductor 33, a primary transfer roll 37, and an intermediate transfer belt 40. Further, the primary transfer positions TY1, TM1, TC1, and TK1A are set between the photoconductors 33Y, 33M, 33C, and 33K and the intermediate transfer belt 40, respectively.

The second image forming unit 50 has the same configuration as the above-described first image forming unit 30 except that colors for forming an image are different. The second image forming unit 50 includes four image forming sections 52 and an endless intermediate transfer belt 60 as an example of an intermediate transfer body. The toner images formed by the four image forming sections 52 are transferred to the intermediate transfer belt 60, and the intermediate transfer belt 60 is mounted to be rotatable counterclockwise with a front view of FIG. 2.

In addition, the image forming section 52 has the same configuration as the image forming section 32 of the first image forming unit 30. Further, the intermediate transfer belt 60 and the primary transfer roll 57 described later have the same configuration as the intermediate transfer belt 40 and the primary transfer roll 37 of the first image forming unit 30. Further, the other constituent members configuring the second image forming unit 50 are the same as in the first image forming unit 30.

The image forming section 52 includes an image forming section 52K that forms a black toner image of black color, an image forming section 52G that forms a gold toner image of gold color, an image forming section 52S that forms a silver toner image of silver color, and an image forming section 52W that forms a white toner image of white color. The four image forming sections 52 are disposed in the order of the image forming section 52W, the image forming section 52S, the image forming section 52G, and the image forming section 52K, from the rotation direction upstream side (in the present example, the side closer to the support roll 64 described later). That is, in the image forming section 52, the image forming section 52K is disposed on the most rotation direction downstream side, the image forming section 52G and the image forming section 52S are disposed on the rotation direction upstream side with respect to the image forming section 52K, and the image forming section 52W is disposed on the most rotation direction upstream side.

In addition, in a case where it is not necessary to distinguish between W, S, G, and K, W, S, G, and K are omitted.

The image forming section 52 includes a photoconductor 53, a charging member 54, an exposure device 55, and a developing device 56.

Developing rolls 59W, 59S, 59G, and 59K are provided in the developing device 56, respectively, and are applied with a developing bias by the power supply device 159 (see FIG. 3), respectively.

Further, the primary transfer rolls 57W, 57S, 57G, and 57K are disposed at positions facing respective photoconductors 53 with the intermediate transfer belt 60 interposed therebetween. The intermediate transfer belt 60 is wound around a support roll 64 and a backup roll 62 disposed on a secondary transfer unit 76 on the downstream side, which will be described later. In addition, the primary transfer unit 72 includes the photoconductor 53, the primary transfer roll 57, and the intermediate transfer belt 60. Further, the primary transfer positions TW1, TS1, TG1, and TK1B are set between the photoconductors 53Y, 53M, 53C, and 53W and the intermediate transfer belt 60, respectively.

Figure 3:
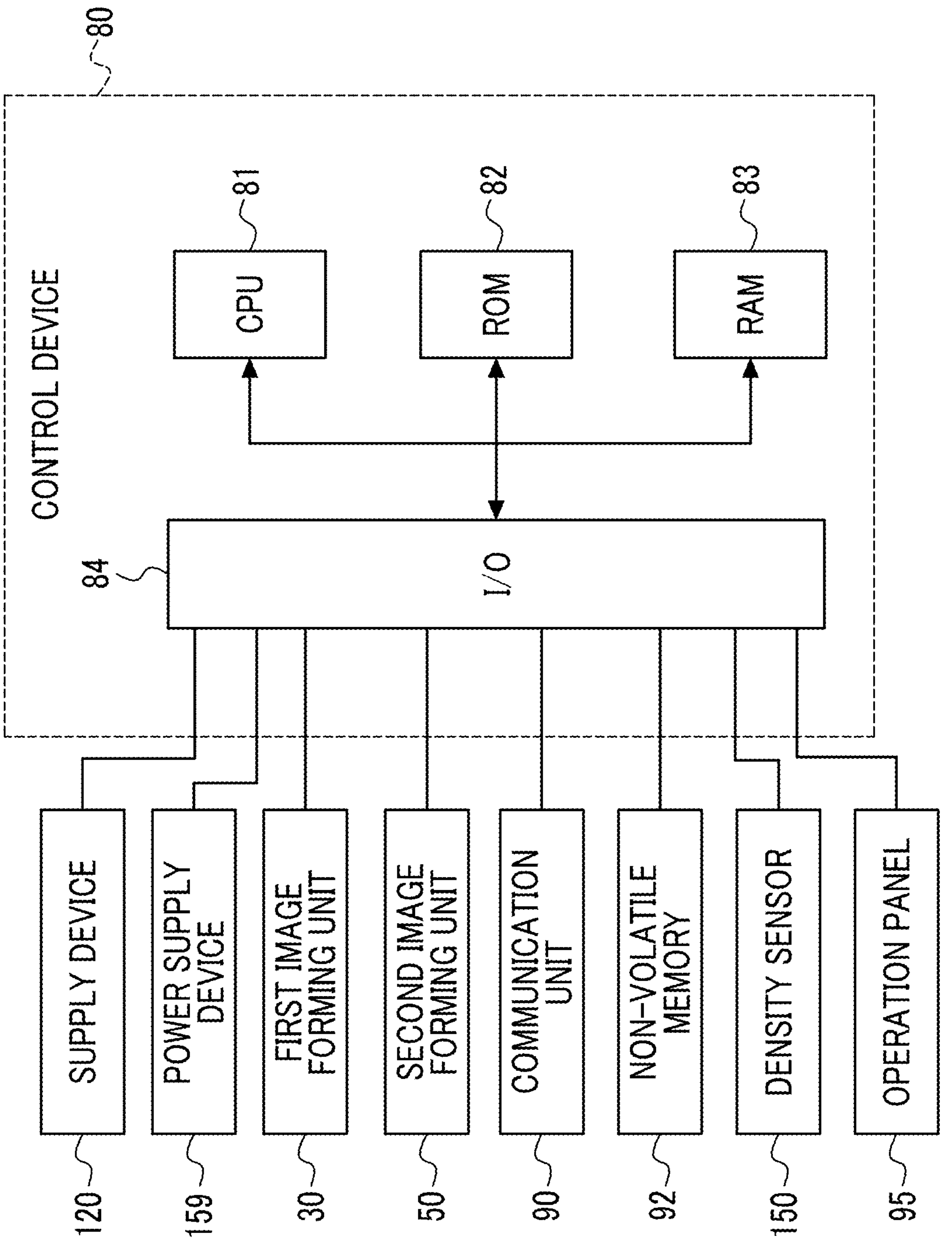
FIG. 3 is a block diagram showing an example of a hardware configuration of the image forming apparatus.
Figure 4:
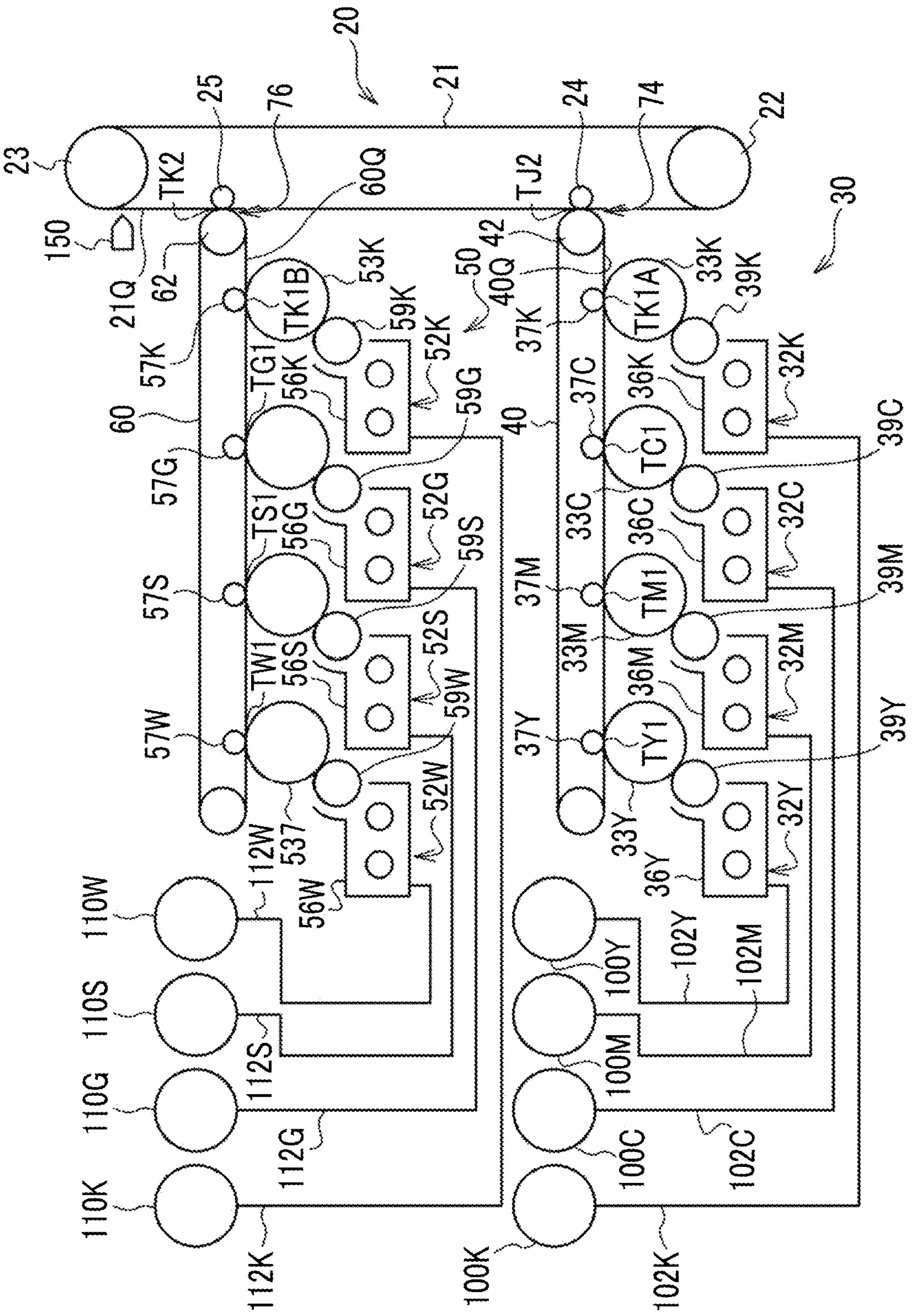
FIG. 4 is a schematic diagram schematically showing a configuration of a major part of the image forming apparatus according to the first exemplary embodiment.

As shown in FIG. 4, the developing device 36 of the image forming section 32 of each color of the first image forming unit 30 and the developing device 56 of the image forming section 52 of each color of the second image forming unit 50 are connected to a plurality of toner cartridges 100 and 110 containing toner corresponding to each color via supply paths 102 and 112. The toner accommodating the respective toner cartridges 100 and 110 is appropriately supplied to the developing devices 36 and 56 of respective colors via the supply paths 102 and 112 by operating a supply device 120 (see FIG. 3) provided in the supply paths 102 and 112. In addition, the supply device 120 (see FIG. 3) is provided with individual developing devices 36Y, 36M, 36C, 36K, 56C, 56W, 56G, and 56K from the toner cartridges 100Y, 100M, 100C, 100K, 110W, 110S, 110G, and 110K, respectively. The configuration is such that toner can be supplied to the device.

Details of Conveyor Belt Device

Next, the details of the conveyor belt device 20 will be described.

As shown in FIG. 2, the conveyor belt device 20 includes an endless conveyor belt 21, support rolls 22 and 23 that support the conveyor belt 21, the conveyance rolls 14, and backup rolls that sandwich the intermediate transfer belts 40 and 60. Secondary transfer rolls 24 and 25 disposed at positions facing the 42 and 62 are included.

The secondary transfer roll 24 sandwiches the recording paper P and the conveyor belt 21 between the backup roll 42 and the secondary transfer roll 24, and transfers the toner image formed on the intermediate transfer belt 40 of the first image forming unit 30 to the recording paper P. Similarly, the secondary transfer roll 25 sandwiches the recording paper P and the conveyor belt 21 between the backup roll 62 and the secondary transfer roll 25, and transfers the toner image formed on the intermediate transfer belt 60 of the second image forming unit 50 to the recording paper P.

In addition, the secondary transfer unit 74 includes the backup roll 42, the secondary transfer roll 24, and the intermediate transfer belt 40. Further, the secondary transfer unit 76 includes the backup roll 62, the secondary transfer roll 25, and the intermediate transfer belt 60.

A transfer bias is applied to the secondary transfer rolls 24 and 25 by the power supply device 159 (see FIG. 3), respectively.

The secondary transfer position TJ2 is defined between the intermediate transfer belt 40 of the first image forming unit 30 and the conveyor belt 21, and the secondary transfer position TK2 is defined between the intermediate transfer belt 60 of the second image forming unit 50 and the conveyor belt 21. In addition, the secondary transfer position TK2 is the most downstream secondary transfer position.

Further, the conveyor belt device 20 includes a belt cleaning device (not shown) that cleans the conveyor belt 21. The belt cleaning device (not shown) performs cleaning on the rotation direction upstream side of the most downstream secondary transfer position TK2 and on the rotation direction downstream side of the most upstream secondary transfer position TJ2. In addition, in the conveyor belt 21, a position to be cleaned by a belt cleaning device (not shown) is defined as a cleaning position CL.

Here, each image forming section 32 of the first image forming unit 30 and each image forming section 52 of the second image forming unit 50 form a color chart 300 (see FIG. 6) composed of an automatic adjustment patch image for automatically adjusting the density with each color toner, and correction patch images 312A, 312B, 312C, 312D, 312E, 322A, 322B, 322C, 322D, and 322E. Hereinafter, the correction patch images 312A, 312B, 312C, 312D, 312E, 322A, 322B, 322C, 322D, and 322E may be referred to as correction patch images 312, 322.

As shown in FIG. 4, a density sensor 150 as an example of a detection device that detects the densities of the automatic adjustment patch image and the correction patch images 312 and 322 that are secondarily transferred to the conveyor belt 21 is provided near the upper end of the conveyor belt 21. The density sensor 150 detects the densities of the automatic adjustment patch image and the correction patch images 312 and 322 in a flat portion 21Q between the secondary transfer position TK2 and the upper support roll 23 on which the conveyor belt 21 is wound, on the downstream side of the most downstream secondary transfer position TK2.

The density sensor 150 may be disposed at a position at which the densities of the automatic adjustment patch image and the correction patch images 312A, 312B, 312C, 312D, 312E, 322A, 322B, 322C, 322D, and 322E on the upstream side in the rotation direction of the most downstream secondary transfer position TK2 and on the upstream side in the rotation direction of the cleaning position CL.

The operation panel 95 of the present exemplary embodiment shown in FIG. 1 is a display on which a touch panel is superimposed, but the present invention is not limited thereto. An icon image or the like is displayed on the operation panel 95 as an example of an image representing an item that is an operation target in order to execute a function desired by the user. There is no restriction on the type of the icon image as long as the icon image is an operation target of the user, and the icon image includes, for example, a button, a scroll bar, a check box, and a radio button. In a case where a user operation is performed on the icon image, a process associated with the operation content in advance is executed by the control device 80 (see FIG. 3) described later, and a response to the operation is displayed on the operation panel 95.

Control Device

Next, the control device 80 that controls the operation of the image forming apparatus 10 will be described.

FIG. 3 is a block diagram showing a hardware configuration of the image forming apparatus 10. As shown in FIG. 3, the control device 80 includes a first image forming unit 30, a second image forming unit 50, a communication unit 90, a non-volatile memory 92, a supply device 120, a power supply device 159, a density sensor 150, and an operation panel 95, and the like are electrically connected.

The control device 80 is connected to a Central Processing Unit (CPU) 81, a Read Only Memory (ROM) 82, a Random Access Memory (RAM) 83, and an input/output interface (I/O) 84 via a bus. In addition, the CPU 81 is an example of a processor.

Here, the ROM 82 stores an image formation control program (not shown) to be executed by the CPU 81. Then, the CPU 81 reads the image formation control program (not shown) from the ROM 82 and expands the image formation control program into the RAM 83 to execute a printing process or the like by the image formation control program (not shown).

Further, the first image forming unit 30, the second image forming unit 50, the communication unit 90, and the non-volatile memory 92 are connected to the I/O 84. The communication unit 90 is an interface for mutual data communication between a terminal device such as a personal computer (not shown) and an image forming apparatus 10. The non-volatile memory 92 stores information necessary for the image forming apparatus 10 to execute the image forming operation.

The control device 80 performs various controls for forming a toner image on the intermediate transfer belt 40 (see FIG. 2 and the like) by the image forming section 32 (see FIG. 2 and the like) of each color of the first image forming unit 30. The control device 80 performs various controls for forming a toner image on the intermediate transfer belt 60 (see FIG. 2 and the like) by the image forming section 52 (see FIG. 2 and the like) of each color of the second image forming unit 50.

Further, the control device 80 controls the developing bias to be applied by the power supply device 159 to the developing rolls 39Y, 39M, 39C, 39W, 59T, 59S, 59G, and 59K (see FIG. 2 or the like) of the developing devices 36 and 56. Further, the control device 80 controls the transfer bias to be applied by the power supply device 159 to the secondary transfer rolls 24 and 25 (see FIG. 2 or the like).

In addition, the control device 80 uses the supply device 120 to control the supply timing, supply amount, and the like of each color toner of the toner cartridges 100Y, 100M, 100C, 100K, 110W, 110S, 110G, and 110K (see FIG. 3) to be supplied to the developing devices 36Y, 36M, 36C, 36K, 56W, 56S, 56G, and 56K (see FIG. 2 and the like).

In addition, the control device 80 executes a mode of automatically adjusting the density of the toner image, which will be described later, and a mode in which the user corrects the density.

Figure 5:
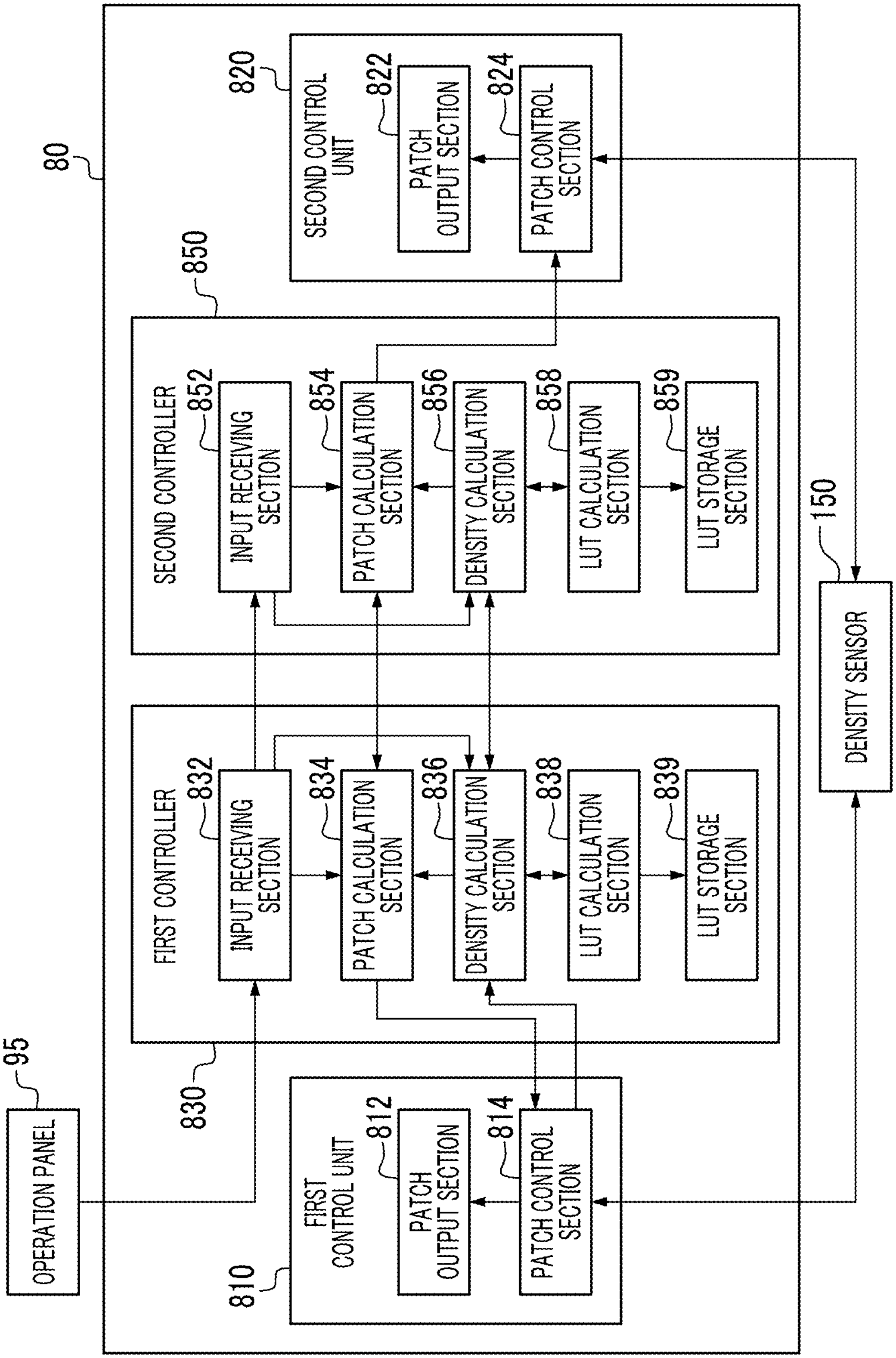
FIG. 5 is a block diagram showing an example of a functional configuration of a control device.

FIG. 5 is a block diagram showing an example of a functional configuration of the control device 80.

The control device 80 includes a first control unit 810 and a first controller 830 for the first image forming unit 30, and a second control unit 820 and a second controller 850 for the second image forming unit 50, as a functional configuration.

The first control unit 810 and the second control unit 820 have patch output sections 812 and 822 and patch control sections 814 and 824 to output, respectively. The first controller 830 and the second controller 850 include input receiving sections 832 and 852, patch calculation sections 834 and 854, density calculation sections 836 and 856, LUT calculation sections 838 and 858, and LUT storage sections 839 and 859, respectively. Note that "LUT" is an abbreviation for a lookup table and is a mathematical formula that defines the density adjustment of an image.

The input receiving sections 832 and 852 have a function of sharing the information input from the operation panel 95 between the first controller 830 and the second controller 850. Further, the input receiving sections 832 and 852 have a function of passing information input from the operation panel 95 to the patch calculation sections 834 and 854.

The patch calculation sections 834 and 854 specify the density to be corrected in the correction patch images 312 and 322 in the color chart 300 (see FIG. 6) described later, and have a function of requesting output and calculation of the correction patch image having the specified density to the patch control sections 814 and 824.

The density calculation sections 836 and 856 have a function of calculating the density of the correction patch image and requesting the LUT calculation sections 838 and 858 to create a replacement LUT in which the input value to be described later is replaced. In addition, the density information is shared between the density calculation section 836 and the density calculation section 856.

The LUT calculation sections 838 and 858 have a function of creating a replacement LUT. The LUT storage sections 839 and 859 have a function of storing the replacement LUT created by the LUT calculation sections 838 and 858.

The patch control sections 814 and 824 have a function of transmitting density information of the correction patch image received from the patch calculation sections 834 and 854 to the patch output sections 812 and 824. Further, the patch control sections 814 and 824 receive the density information of the density patch image detected from the density sensor 150 (see FIG. 2), and pass the density information of the correction patch image to the density calculation sections 836 and 856. The patch output sections 812 and 822 have a function of forming and outputting a correction patch image based on the density information transmitted from the patch control sections 814 and 824.

Image Forming Process

Next, the outline of the image forming process in the image forming apparatus 10 will be described.

First, the CPU 81 of the control device 80 controls each image forming section 32 such that a toner image is formed on the intermediate transfer belt 40 of the first image forming unit 30. Similarly, each image forming section 52 is controlled such that a toner image is formed on the intermediate transfer belt 60 of the second image forming unit 50.

Specifically, the CPU 81 applies a voltage to the charging members 34 and 54, and charges the surfaces of the photoconductors 33 and 53 so as to have a predetermined potential, by using the charging members 34 and 54 to which the voltage is applied. Subsequently, the control device 80 irradiates the surfaces of the photoconductors 33 and 53 charged by the charging members 34 and 54 with exposure light by the exposure devices 35 and 55 to form an electrostatic latent image, based on the image data acquired via the communication unit 90. Thus, an electrostatic latent image corresponding to the image data is formed on the surfaces of the photoconductors 33 and 53.

Next, the CPU 81 develops the electrostatic latent image formed by the exposure devices 35 and 55 by the developing devices 36 and 56 and visualizes the electrostatic latent image as a toner image. Further, the control device 80 superimposes and transfers the toner image formed on the surfaces of the photoconductors 33 and 53 of each color on the intermediate transfer belts 40 and 60, by the primary transfer rolls 37 and 57.

In this way, in the first image forming unit 30, for example, a toner image on which yellow (Y), magenta (M), cyan (C), and black (K) toners are superimposed is formed on the intermediate transfer belt 40. Similarly, in the second image forming unit 50, for example, a toner image in which black (K), gold color (G), silver color (S), and white (W) toners are superimposed is formed on the intermediate transfer belt 60.

Here, the recording paper P sent out from the accommodating unit 12 to the conveyance path 19 by the feed roll 13 is sent out to the secondary transfer position TJ2 on the upstream side in the conveyance direction, after the convey timing is adjusted by the resist roll pair 15 based on the control of the control device 80. At the secondary transfer position TJ2, the recording paper P is conveyed between the backup roll 42 and the secondary transfer roll 24, so that the toner image on the outer peripheral surface of the intermediate transfer belt 40 is transferred to the recording paper P. Then, the recording paper P on which the toner image is transferred is conveyed to the conveyance direction downstream side and reaches the secondary transfer position TK2 on the conveyance direction downstream side.

At this time, the CPU 81 adjusts the timing to start image formation such that the toner image formed on the intermediate transfer belt 60 of the second image forming unit 50 is superimposed and transferred on the recording paper P that have been conveyed from the conveyance direction upstream side.

The recording paper P, on which the toner images of each color formed by the first image forming unit 30 and the second image forming unit 50 are superimposed and transferred, is fixed by the fixing roll pair 16 of the fixing device 18, and then is discharged to the discharge unit 9 provided on the upper part of the image forming apparatus main body 10A, by the discharge roll 17.

Automatic Adjustment of Density

Next, the automatic adjustment of density will be described.

The CPU 81 of the control device 80 forms the patch image for automatic adjustment of each color, secondarily transfers the patch image for automatic adjustment to the conveyor belt 21, and causes the density sensor 150 to detect the patch image for automatic adjustment that has been secondarily transferred. In the present exemplary embodiment, the densities of the patch image for automatic adjustment are 100% and 20%.

The CPU 81 adjusts the developing bias, the exposure light amount, and the like of the development rolls 59Y, 59M, 59C, 59W, 59T, 59S, 59G, and 59K based on the detection value of the density sensor 150. Specifically, the CPU 81 adjusts the developing bias, the amount of exposure light, and the like so that the output density, which is a detection value obtained by detecting an automatic adjustment patch image having an input density of 100%, corresponds to a value corresponding to the input density of 100%. The developing bias, the exposure light amount, and the like are adjusted so that the output density, which is a detection value obtained by detecting an automatic adjustment patch image having an input density of 20%, corresponds to a value corresponding to the input density of 100%.

The "input density" is an input gradation value, and the "output density" is a density of a toner image secondarily transferred to the recording paper P. The output density can be detected by detecting the toner image secondarily transferred to the conveyor belt 21 with the density sensor 150. The "density" of the toner image formed on the recording paper P is calculated from the ratio of the amount of light to be illuminated and the amount of light to be reflected (or transmitted). The density is calculated by the common logarithm of the inverse of the reflectance.

Comparison of Densities of Intermediate Gradation of Toner Images of the Same Color Next, a point of making it possible to compare the densities of the intermediate gradation of the toner images of the same color formed by the image forming sections of different image forming units will be described. Specifically, a point of making it possible to compare the output density of the toner image of the intermediate gradation of the image forming section 32K of the first image forming unit 30 and the output density of the toner image of the intermediate gradation of the image forming section 52K of the second image forming unit 50 shown in FIGS. 2 and 4, at a common intermediate gradation will be described. In addition, "same color" means that the color of the toner as an example of the developer is the same.

That is, in the present exemplary embodiment, as shown in FIGS. 2 and 4, each of the first image forming unit 30 and the second image forming unit 50 has a function of forming a toner image with black toner. The image forming apparatus 10 secondarily transfers, to the recording paper P, the color chart 300 (see FIG. 6) configured with the patch images 312 and 322 for correcting the density of the intermediate gradation formed by the black image forming section 32K of the first image forming unit 30 and the black image forming section 52K of the second image forming unit 50, respectively, and output, and has a density correction mode in which a user visually observes the color chart 300 to correct the density. Therefore, this density correction mode will be described next.

Density Correction Mode

The user gives an instruction for performing the density correction mode from the operation panel 95. Upon receiving this instruction, the control device 80 (see FIG. 3) outputs the color chart 300 shown in FIG. 6.

Figure 6:
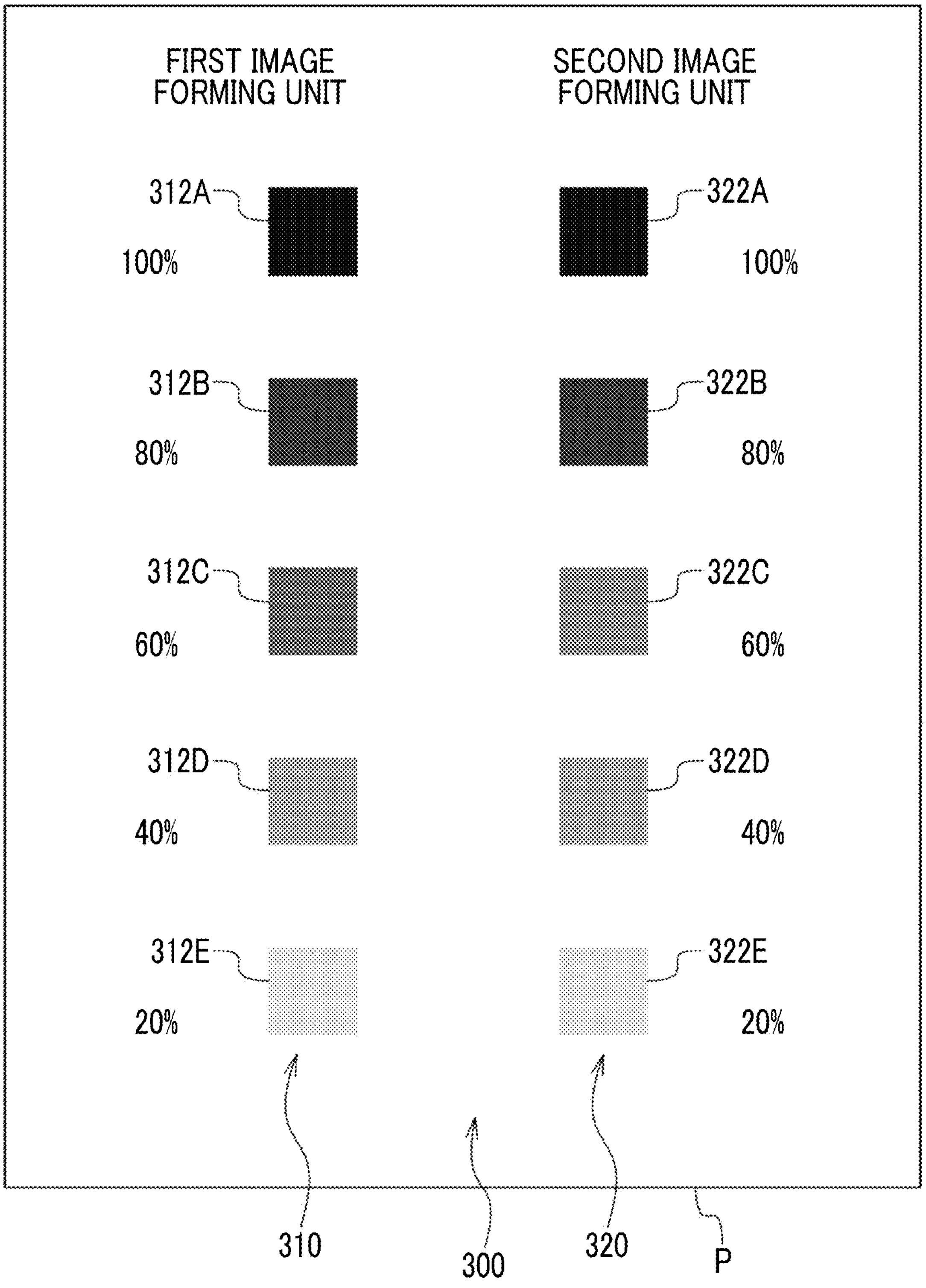
FIG. 6 is a diagram showing an example of a color chart.

As shown in FIG. 6, the color chart 300 is composed of a column 310 of the correction patch images 312A, 312B, 312C, 312D, and 312E formed of the toner images, and a column 320 of the correction patch images 322A, 322B, 322C, 322D, and 322E formed of the toner images.

Specifically, the column 310 is composed of a correction patch image 312A having a density of an input density of 100%, a correction patch image 312B having a density of 80%, a correction patch image 312C having a density of 60%, a correction patch image 312D having a density of 40%, and a correction patch image 312E having a density of 20%, which are formed by the image forming section 32K of the first image forming unit 30.

The column 320 is composed of a correction patch image 322A having a density of an input density of 100%, a correction patch image 322B having a density of 80%, a correction patch image 322C having a density of 60%, a correction patch image 322D having a density of 40%, and a correction patch image 322E having a density of 20%, which are formed by the image forming section 52K of the second image forming unit 50.

The column 310 and the column 320 are formed side by side on one recording paper P. As described above, in a case where these correction patch images are not distinguished, "correction patch image 312 and correction patch image 322" are described. Further, the input density will be described later.

A numerical value indicating each density is printed next to the correction patch images 312 and 322 of each density. Further, the names of the corresponding image forming units are printed on the respective columns 310 and 320. In the present exemplary embodiment, the first image forming unit 30 is printed as "first image forming unit", and the second image forming unit 50 is printed as "second image forming unit".

The user visually compares the correction patch images 312 and 322 of the color chart 300, and confirms whether or not the densities are the same for both.

In this example, the correction patch image 312C having a density of 60% and the correction patch image 322C are slightly different from each other. In addition, in the present example, the correction patch image 322C is lighter than the correction patch image 312C.

The user visually compares the correction patch image 312C of the color chart 300 with a density of 60% and the correction patch image 322C, and visually compares the correction patch image 312C of the first image forming unit 30 with a density of 60% and the second image forming unit. It is determined which of 50 is used as a reference with the correction patch image 322C having a density of 60%. In other words, the density of the correction patch image 312C having a density of 60% of the first image forming unit is corrected to match the density of the correction patch image 322C having a density of 60% of the second image forming unit 50, or the second image. It is determined whether the density of the correction patch image 322C having a density of 60% of the second image forming unit 50 is corrected to match the density of the correction patch image 312C having a density of 60% of the first image forming unit 30. The user may make a determination by any method. In the present exemplary embodiment, the determination is made by the subjectivity of the user.

The density to be adjusted is referred to as a "target density", the image forming unit as a reference is referred to as a "reference unit", and the image forming unit for which the density is corrected is referred to as a "correction unit".

In this example, it is assumed that the user decides to use the correction patch image 312C having a density of 60% of the first image forming unit as a reference. That is, it is determined that the "target density" is the density of 60%, the "reference unit" is the first image forming unit 30, and the "correction unit" is the second image forming unit 50.

After the determination, the user inputs from the operation panel 95 (see FIG. 1) that the target density for density correction is set to a density of 60% and that the first image forming unit 30 is used as a reference unit.

In response to this instruction, after performing a density correction for adjusting the density of 60% of the second image forming unit 50 to the density of 60% of the first image forming unit 30, the control device 80 outputs the color chart 300 after the density correction after reception by being formed on the recording paper P, and ends the density correction mode.

The user visually checks the color chart 300 again. After the checking, in a case where there is no problem, or in a case where there is a problem but within an allowable range, the process ends as it is. In a case where the user determines that further density correction is necessary, the user takes measures such as contacting a service man.

In addition, in a case where the density difference between the correction patch image 312C of the first image forming unit 30 and the correction patch image 322C of the second image forming unit 50 is within a range and it is not necessary to perform a correction for matching the two densities, that fact is displayed on the operation panel 95. In a case where there is no problem or there is a problem but within an allowable range, the user ends the process as it is. In a case where the user determines that the density correction is necessary, the user takes measures such as contacting a service man.

Density Correction

Figure 9:
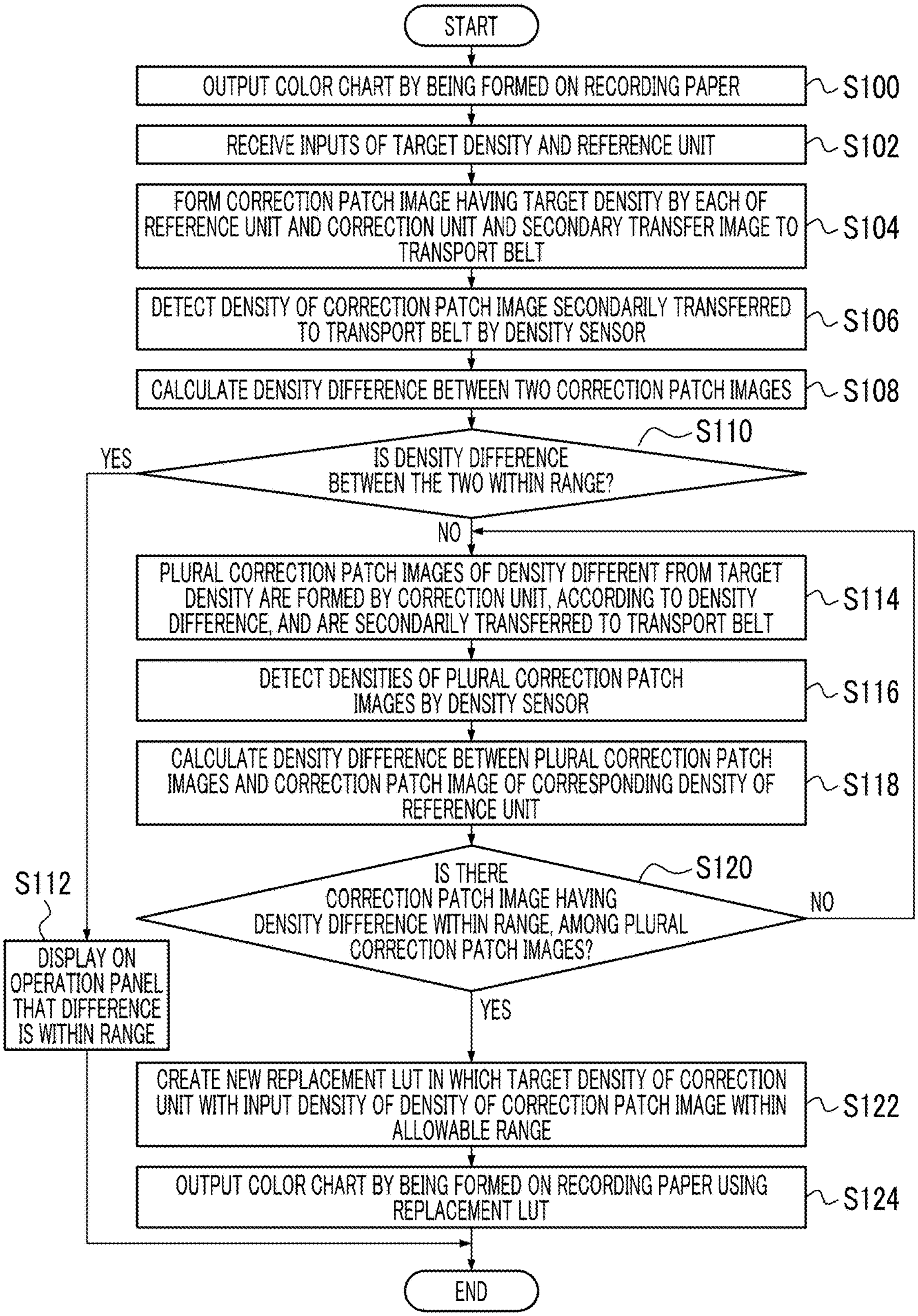
FIG. 9 is a flowchart showing a flow of a density correction mode.

Next, an example of a specific method for density correction in which the CPU 81 (see FIG. 3) of the control device 80 adjusts the density of 60% of the second image forming unit 50 formed on the recording paper P to the density of 60% of the first image forming unit 30 will be described using the flowchart of FIG. 9. In addition, in the present exemplary embodiment, the control device 80 stores a numerical value corresponding to the density. For example, in the present exemplary embodiment, the density of 50% is stored as a numerical value of 125.

In a case where an instruction to perform the density correction mode is received from the operation panel 95 (see FIG. 1) operated by the user, the CPU 81 forms the color chart 300 on the recording paper P and outputs the color chart 300 (step S100). The CPU 81 receives the target density and the reference unit input by the user from the operation panel 95 (step S102). In this example, as described above, the target density is 60%, and the reference unit is the first image forming unit 30.

The CPU 81 forms a correction patch image having an input density of a target density in each of the correction unit and the reference unit, and secondary transfers the image to the conveyor belt 21 (step S104). The correction patch image formed by the correction unit is an example of a target patch image, and the correction patch image formed by the reference unit is an example of a reference patch image.

In the present exemplary embodiment, the first image forming unit 30 forms the correction patch image 312C having an input density of 60%, and the second image forming unit 50 forms the correction patch image 322C having an input density of 60%. The correction patch images are secondarily transferred to the conveyor belt 21. The correction patch image 312C is an example of a reference patch image, and the correction patch image 322C is an example of a target patch image. In addition, as described above, the description of the input density will be described later.

The CPU 81 detects the density of the correction patch image of the target density of the correction unit and the reference unit secondarily transferred to the conveyor belt 21 by the density sensor 150 (step S106). In this example, the density sensor 150 detects the densities of the correction patch images 312C and 322C secondarily transferred to the conveyor belt 21.

The CPU 81 calculates the density difference between the correction patch images of the target densities of the correction unit and the reference unit secondarily transferred to the conveyor belt 21 (step S108). In this example, the difference in density between the correction patch image 312C and the correction patch image 322C having a density of 60% is calculated.

The CPU 81 determines whether or not the density difference is within a preset range (step S110). The range of the density difference in the present exemplary embodiment is less than 0.05.

In a case where the density difference is within the range (step S110: YES), the CPU 81 proceeds to the process of step S112 and displays on the operation panel 95 that the density difference between the two is within the defined range and the correction is unnecessary (step S112).

In a case where the range is out of the range (step S110: NO), the CPU 81 proceeds to the process of step S114, and according to the density difference, a plurality of correction patch images as an example of the target patch image are generated by the correction unit at an input density different from the target density are formed and secondarily transferred to a conveyor belt (step: S114). Specifically, in a case where the density of the correction unit is darker than that of the reference unit, the correction unit forms a correction patch image with an input density lighter than the target density. Specifically, in a case where the density of the correction unit is lighter than that of the reference unit, the correction unit forms a correction patch image with an input density darker than the target density.

In addition, for example, a plurality of (in the present example, three) correction patch images formed with a lighter input density or a dark input density are formed in increments of 2% from the correction patch image 312C.

In the present exemplary embodiment, the density of 60% of the second image forming unit 50 which is the correction unit is lighter than the density of 60% of the first image forming unit 30 which is the reference unit. Therefore, the second image forming unit 50 forms correction patch images having an input density darker than 60%, specifically, a density of 62%, a density of 64%, and a density of 66%.

The CPU 81 detects the density of a plurality of correction patch images secondarily transferred to the conveyor belt 21 by the density sensor 150 (step S116).

The CPU 81 calculates a density difference between the plurality of correction patch images and correction patch image (correction patch image 312C (see FIG. 6) in the present example) of target density of the reference unit (first image forming unit 30 in the present example) (step S118).

The CPU 81 determines whether or not there is a correction patch image, among the plurality of correction patch images, having a density difference within a range from the density of the correction patch image (correction patch image 312C (see FIG. 6) in the present example) of the target density of the reference unit (first image forming unit 30 in the present example) (step S120).

In a case where there is no correction patch image within the range (step S120: NO), the process returns to the process of step S114, and again, according to the density difference, the correction unit forms a plurality of correction patch images with a density different from the target density and secondarily transfers the correction patch images on the conveyor belt (step: S114). At this time, the correction patch image is formed with a density different from the previous density. For example, in a case where the density of the correction unit is darker than that of the reference unit, a correction patch image is formed with an input density lighter than the previous density. In a case where the density of the correction unit is lighter than that of the reference unit, a correction patch image is formed with an input density darker than the previous density. In the case of the present exemplary embodiment, for example, correction patch images having an input density of 68%, a density of 70%, and a density of 72% are formed.

In a case where there is a correction patch image within the range (step S120: YES), the process proceeds to step S122, and a replacement LUT is created in which the density of the correction patch image within the range is replaced with a density at which the input density is 60%. In a case where there are a plurality of correction patch images within the range, the density having the smallest density difference is adopted (step S122).

Specifically, for example, it is assumed that the difference between the correction patch image having an input density of 70% formed by the second image forming unit 50 and the correction patch image 312C having a density of 60% of the first image forming unit 30 was within a range. In this case, in a case where the second image forming unit 50 forms a toner image having an input density of 60%, a replacement LUT is created in which the input density is replaced with a density of 70%. The replacement LUT will be described later.

The CPU 81 outputs the color chart 300 using the replacement LUT (step S124).

Replacement LUT

Next, the replacement LUT will be described. As described above, "LUT" is an abbreviation for a lookup table and is a mathematical formula that defines the density adjustment of an image. In this description, a graph is used to make the concept of replacement easy to understand, but the graph is not actually stored in the control device 80.

Figure 7:
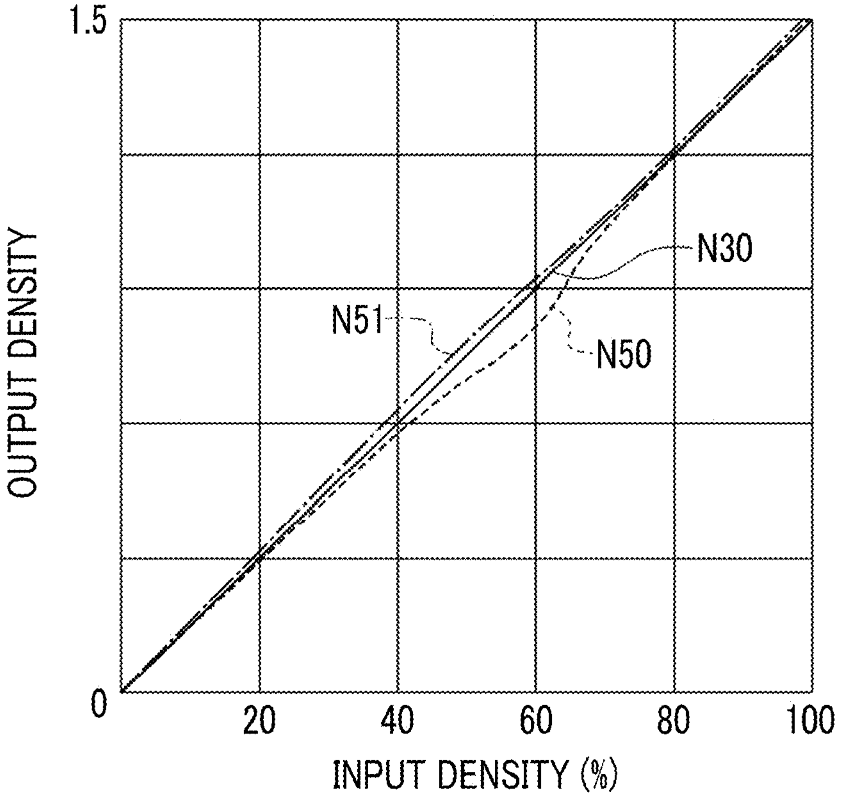
FIG. 7 is a graph illustrating an example of a relationship between an input density and an output density.
Figure 8:
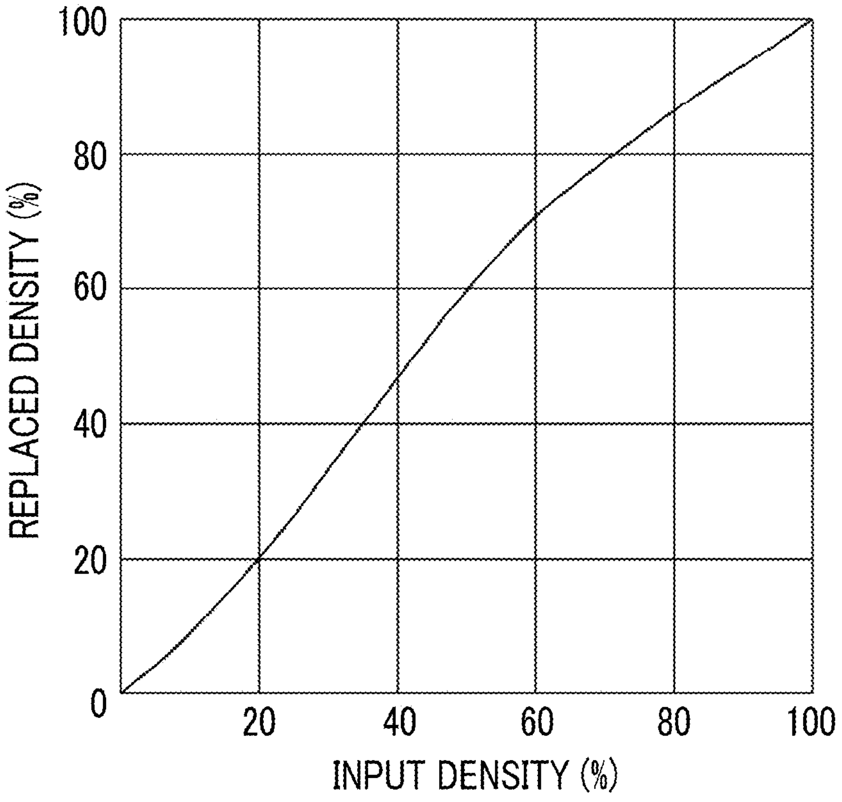
FIG. 8 is a graph illustrating an example of an LUT in which an input value is replaced.

FIG. 7 is a graph showing a relationship between an input density and an output density of the same color, that is, in the present exemplary embodiment, an input density and an output density of black. As described above, the input density is an input gradation value, and the output density is a density detected by the density sensor 150 of the secondary transferred toner image. Further, as described above, in the present exemplary embodiment, the input density and the output density are stored in the control device 80 as corresponding numerical values.

The line N30 indicates the relationship between the input density and the output density of the image forming section 32K of the first image forming unit 30. Although the line N30 is a straight line for easy understanding, in reality, the line N30 is almost never a straight line.

The line N50 indicates the relationship between the input density and the output density of the image forming section 52K of the second image forming unit 50 in a case where the replacement LUT is not used. The line N51 indicates the relationship between the input density and the output density of the image forming section 52K of the second image forming unit 50 in a case where the input value is replaced by the replacement LUT. The input density of the line N51 is the input density before the replacement.

As described above, in the line N50, the input density is 60%, but the output density is 55%, which is smaller than the density of 60%. Further, when the input density of the image forming section 52K of the second image forming unit 50 is the density of 70%, the output density is assumed to be the density of 60%. That is, it is assumed that the input density of the correction patch image 312C is 60%, the density of the correction patch image 322C is 55%, and the density of the correction patch within the range in step S120 is 70%.

Therefore, a replacement LUT is created in which with respect to the input density of the image forming section 52K of the second image forming unit 50, a density of 60% is replaced with a density of 70%.

As described above, in the automatic density adjustment, the density is automatically adjusted between the density of 100% and the density of 20%. Therefore, it is assumed that the input density and the output density are the same or substantially the same for the density of 100% and the density of 20%. Therefore, the replacement LUT is created by using the density of 100% and the density of 20% as fixed values, and by performing linear interpolation, with the change of replacing the input density of 60% with the input density of 70% as the maximum change point. Note that FIG. 7 is a graph conceptually illustrating a replacement LUT created through linear interpolation.

Here, a case where the density correction has already been performed once and there is a replacement LUT will be described.

In a case where the density is adjusted for the second time or later, in a case where the color chart 300 is formed on the recording paper P in step S100 and is output, a replacement LUT is used. However, in a case where the correction patch image is secondarily transferred to the conveyor belt 21 in step S104 or the like, the replacement LUT is not used.

Therefore, for example, in a case where there is already a replacement LUT that replaces the input density of 60% with the input density 65%, the replacement LUT is created by setting the input density of 70% as an output value for the input density of 60% instead of the input density 65%. That is, as described above, a replacement LUT that replaces the input density of 60% with the input density of 70% is created and overwritten.

Image Formation

Figure 10:
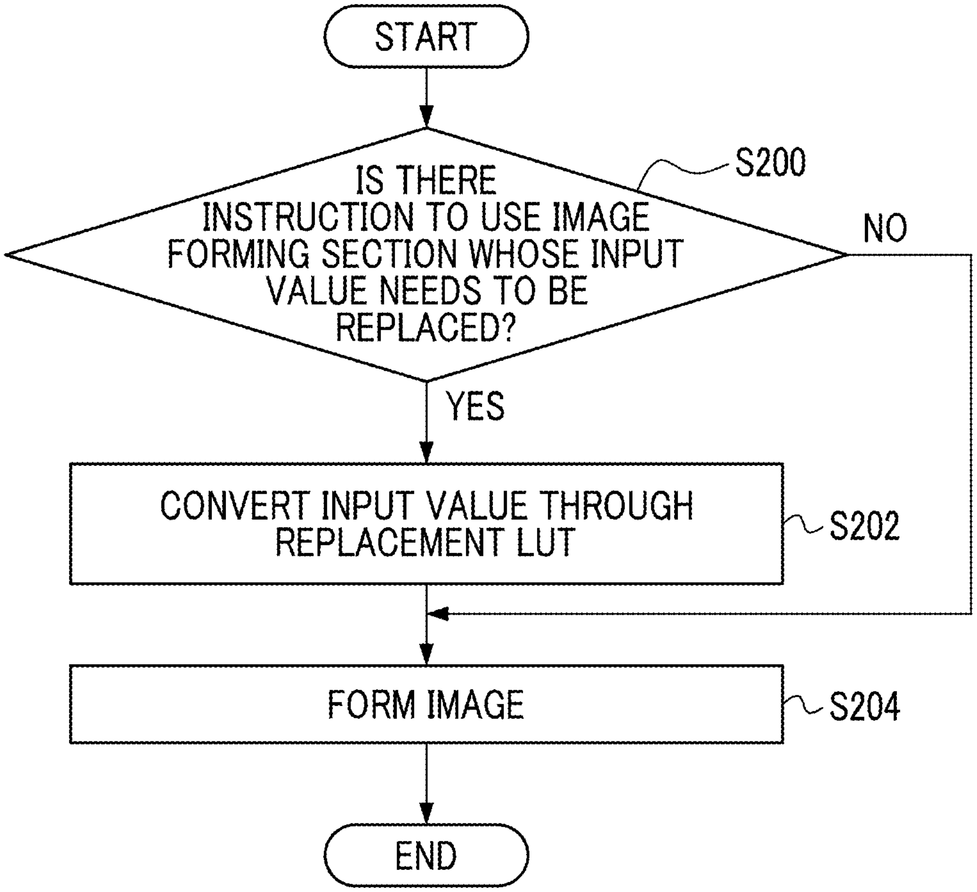
FIG. 10 is a flowchart showing a flow of image formation.

Next, an image forming process in a case where the replacement LUT is used will be described using the flowchart of FIG. 10.

Upon receiving the printing instruction, the CPU 81 (see FIG. 3) of the control device 80 determines whether or not there is an instruction to use the image forming unit whose input value needs to be replaced (step S200). In the case of the present exemplary embodiment, it is determined whether or not there is an instruction to form an image by using the image forming section 52K of the second image forming unit 50.

In a case where there is no need (step S200: NO), the CPU 81 proceeds to the process of step S204 and forms an image on the recording paper P (step S204).

In a case where there is a need (step S200: YES), the CPU 81 proceeds to the process of step S202, converts the input density through the replacement LUT, forms an image on the recording paper P, and outputs the image (step S202).

Action

Next, the action of the present exemplary embodiment will be described.

In the image forming apparatus 10 of the present exemplary embodiment, the color chart 300 on which the correction patch image 312 of the intermediate gradation of the image forming section 32K of the first image forming unit 30 and the correction patch image 322 of the intermediate gradation of the image forming section 52K of the second image forming unit 50 of the same color, black, in the present exemplary embodiment, are formed is secondarily transferred to the recording paper P and output. Therefore, the density of the intermediate gradation of the image forming section 32K of the first image forming unit 30 and the density of the intermediate gradation of the image forming section 52K of the second image forming unit 50 may be compared with a common intermediate gradation.

From another point of view, as compared with the case where the color chart 300 is not output, it may be possible to easily check whether or not there is a difference between the density of the intermediate gradation of the image forming section 32K of the first image forming unit 30 and the density of the intermediate gradation of the image forming section 52K of the second image forming unit 50.

Further, the color chart 300 is secondarily transferred to one recording paper P and output. In the present exemplary embodiment, two columns of the column 310 of the correction patch images 312A, 312B, 312C, 312D, and 312E, and the column 320 of the correction patch images 322A, 322B, 322C, 322D, and 322E which are formed of the toner images are formed on one sheet of recording paper P and output.

Therefore, compared with a case where the color chart is divided and output on a plurality of sheets of recording paper P, the density of the intermediate gradation may be compared with the common intermediate gradation. From another viewpoint, it may be possible to accurately check whether or not there is a difference between the densities of the intermediate gradations.

Further, the column 310 of the correction patch image 312 and the column 320 of the correction patch image 320 are formed side by side and output. Therefore, in comparison with a case where the correction patch image 312 and the correction patch image 320 are formed and output as an example, it may be possible to make it possible to compare the densities of the common intermediate gradation. From another viewpoint, it is possible to accurately check whether or not there is a difference in the densities of intermediate gradation.

Further, after outputting the color chart 300, the inputs of a target density of a target for which the density is to be adjusted in the density of the color chart 300 (density of 60% in the present exemplary embodiment) and a reference unit which is a reference (the first image forming unit 30 in the present exemplary embodiment) are received. Therefore, as compared with a case where only the target density is input, the densities of intermediate gradation in the toner image of the image forming section 32K of the first image forming unit 30 and the toner image of the image forming section 52K of the second image forming unit 50 may be aligned.

Further, since a correction is performed for adjusting the density of the toner image having the input density of 60% formed by the image forming section 52K of the second image forming unit 50 to the density of the toner image having the input density of 60% formed by the image forming section 32K of the first image forming unit 30 which is a reference, it may be possible to align the densities of intermediate gradation as compared with the case where the correction is not performed.

Further, in a case where the image forming section 52K of the second image forming unit 50 forms an image, the input density is replaced through the replacement LUT. Therefore, as compared with a case where the input density is not replaced, the densities of intermediate gradation of the toner image formed by the image forming section 32K of the first image forming unit 30 and the toner image formed by the image forming section 52K of the second image forming unit 50 may be adjusted.

Further, until the density difference between the correction patch image formed by the second image forming unit 50, which is the correction unit, and the correction patch image 322C of the target density of the first image forming unit 30, which is the reference unit, is within the range, the density of the correction patch image of the correction unit is changed to reform the correction patch image.

Therefore, as compared with a case where the density of the correction patch image formed by the second image forming unit 50 is not changed not to reform the correction patch image, the density of intermediate gradation of the toner images formed by the image forming section 32K of the first image forming unit 30, which is the reference unit, and the image forming section 52K of the second image forming unit 50, which is the correction unit, may be more accurately aligned.

Further, after the density is corrected, the color chart 300 in which the input value is converted through the replacement LUT is formed on the recording paper P and is output. Therefore, the user may easily check that the densities of intermediate gradation of the toner images formed by the image forming section 32K of the first image forming unit 30, which is the reference unit, and the image forming section 52K of the second image forming unit 50, which is the correction unit, are aligned.

Others

The present invention is not limited to the above exemplary embodiments.

For example, in the above exemplary embodiment, the input of the execution of the density correction mode, the input of the target density, and the input of the reference unit, performed by the user, are performed from the operation panel 95, but the present invention is not limited thereto. For example, the user may input from a personal computer, a smartphone, a tablet terminal, or the like that is electrically connected to the image forming apparatus 10 by wire or wireless.

Further, for example, in the above exemplary embodiment, in the image forming apparatus 10, the first image forming unit 30 and the second image forming unit 50 have the black toner images of the same color, but the present invention is not limited thereto. For example, all four colors may be the same colors. In a case where a plurality of colors are the same color, a target density and a reference unit are determined and input for each color, and the CPU creates a replacement LUT for correction for each color. For example, for cyan, the target density is 40% and the reference unit is the first image forming unit 30, and for magenta, the target density is 60% and the reference unit is the second image forming unit 50.

Further, for example, in the above exemplary embodiments, the image forming apparatus 10 includes two image forming units, that is, the first image forming unit 30 and the second image forming unit 50, but the present invention is not limited thereto. The image forming apparatus may include three or more image forming units. Further, for example, in the above exemplary embodiments, the first image forming unit 30 and the second image forming unit 50 have four image forming sections 32 and 52, respectively, but the present invention is not limited thereto. The image forming unit may have two or more image forming sections.

Here, the case of an image forming apparatus including three or more image forming units will be described. One image forming unit to be used as a reference is determined, and an image forming unit whose density is adjusted to the reference image forming unit is defined as a correction unit. The number of correction units may be one or plural. In addition, in this case, in addition to the reference unit, the user may input a correction unit for correcting the density.

The color chart 300 shown in FIG. 6 is an example and is not limited thereto. For example, although the density of the correction patch images 312 and 322 of the color chart 300 is in increments of 20%, the increment width of 20% or more and the increment width of less than 20% may be used. Further, the increment width of the density may be reduced as the density becomes lighter. For example, the densities are 3%, 5%, 10%, 15%, 20%, 30%, 40%, 60%, 80%, and 100%. Further, the density increment may be changed for each color.

Further, various types of control by the control device 80 may be read as a mode or a control form.

Further, in the above exemplary embodiments, the recording paper P is used as an example of the recording medium, but the present invention is not limited thereto. Other than the recording paper P, for example, an OHP sheet or the like may be used.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed. More specifically, the hardware structure of these various processors is an electric circuit in which circuit elements such as semiconductor elements are combined.

In the above exemplary embodiment, the mode in which the program is stored (installed) in the ROM or the storage in advance has been described, but the present invention is not limited to this. The program may be provided in a form recorded on a Compact Disk Read Only Memory (CD-ROM), a Digital Versatile Disk Read Only Memory (DVD-ROM), a Universal Serial Bus (USB) memory, or the like. Further, the program may be downloaded from an external apparatus via a network.

Further, the configuration of the image forming apparatus is not limited to the configuration of the above exemplary embodiments, and various configurations can be used. Further, the present invention can be implemented in various ways without departing from the concept of the present invention.

Supplementary Note (((1)))

An image forming apparatus comprising:

a plurality of image forming units each having a plurality of image forming sections, and an intermediate transfer body on which toner images formed by the plurality of image forming sections are primarily transferred;

a plurality of secondary transfer units that are provided corresponding to the plurality of image forming units, and secondarily transfer the toner images of the intermediate transfer body to a recording medium; and a processor, wherein each image forming unit has the image forming section of the same color, and the processor is configured to:

in response to an instruction to output a color chart of the same color, execute a mode in which the color chart of the toner image having a density of intermediate gradation, formed by the image forming section of the same color for each image forming unit, is secondarily transferred to the recording medium and output.

(((2)))

The image forming apparatus according to (((1))), wherein in the mode, the color chart is formed on one recording medium and output.

(((3)))

The image forming apparatus according to (((1))), wherein columns of toner images having the density of intermediate gradation, constituting the color chart, formed for respective image forming units, are arranged side by side on one recording medium.

(((4)))

The image forming apparatus according to any one of (((1))) to (((3))), wherein in the mode, after the color chart is output, inputs of a target density of a target for which density is adjusted in the density of intermediate gradation of the color chart and the image forming unit as a reference are received.

(((5)))

The image forming apparatus according to (((4))), wherein in the mode, a correction is performed for adjusting a density of the toner image of the same color formed by another image forming unit to a density of the toner image of the same color having the target density, formed by the image forming unit as the reference.

(((6)))

The image forming apparatus according to (((4))) or (((5))), further comprising:

a detection device that detects a density of the toner image, wherein in the mode, a reference patch image of the target density of the image forming unit as the reference and a target patch image of the target density of the other image forming unit are formed, and the detection device is caused to perform detection, a plurality of the target patch images having densities different from the target density are formed based on a density difference between the two patch images by the other image forming unit, and the detection device is caused to perform detection, and an input density of the target density in a case where the image forming section of the same color of the other image forming unit forms the toner image is replaced with an input density of the target patch image having a density closest to the reference patch image.

(((7)))

The image forming apparatus according to any one of (((4))) to (((6))), wherein in the mode, a density of the target patch image is changed to reform the target patch image until a density difference between the density of the target patch image and the target patch image having the density closest to the reference patch image falls within a predetermined range.

(((8)))

The image forming apparatus according to any one of (((4))) to (((7))), wherein in the mode, after the inputs of the target density and the image forming unit as the reference are received, the color chart is secondarily transferred to the recording medium and output again.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a plurality of image forming units each having a plurality of image forming sections, and an intermediate transfer body on which toner images formed by the plurality of image forming sections are primarily transferred;

a plurality of secondary transfer units that are provided corresponding to the plurality of image forming units, and secondarily transfer the toner images of the intermediate transfer body to a recording medium; and a processor, wherein each image forming unit has the image forming section of the same color, and the processor is configured to:

in response to an instruction to output a color chart of the same color, execute a mode in which the color chart of the toner image having a density of intermediate gradation is secondarily transferred to the recording medium and output, wherein the color chart of the toner image is formed by the image forming section of the same color of each of the plurality of image forming units.

2. The image forming apparatus according to claim 1, wherein in the mode, the color chart is formed on one recording medium and output.

3. The image forming apparatus according to claim 2, wherein columns of toner images having the density of intermediate gradation, constituting the color chart, formed for respective image forming units, are arranged side by side on one recording medium.

4. The image forming apparatus according to claim 3, wherein in the mode, after the color chart is output, inputs of a target density of a target for which density is adjusted in the density of intermediate gradation of the color chart and the image forming unit as a reference are received.

5. The image forming apparatus according to claim 4, wherein in the mode, a correction is performed for adjusting a density of the toner image of the same color formed by another image forming units to a density of the toner image of the same color having the target density, formed by the image forming unit as the reference.

6. The image forming apparatus according to claim 5, wherein in the mode, after the inputs of the target density and the image forming unit as the reference are received, the color chart is secondarily transferred to the recording medium and output again.

7. The image forming apparatus according to claim 4, further comprising:

a detection device that detects a density of the toner image, wherein in the mode, a reference patch image of the target density formed with the toner image of the image forming unit as the reference and a target patch image of the target density formed with the toner image of another image forming unit are formed, and the detection device is caused to perform detection, a plurality of the target patch images having densities different from the target density are formed based on a density difference between the two patch images by the other image forming unit, and the detection device is caused to perform detection, and an input density of the target density in a case where the image forming section of the same color of the other image forming unit forms the toner image is replaced with an input density of the target patch image having a density closest to the reference patch image.

8. The image forming apparatus according to claim 7, wherein in the mode, a density of the target patch image is changed to reform the target patch image until a density difference between the density of the target patch image and the target patch image having the density closest to the reference patch image falls within a predetermined range.

9. The image forming apparatus according to claim 2, wherein in the mode, after the color chart is output, inputs of a target density of a target for which density is adjusted in the density of intermediate gradation of the color chart and the image forming unit as a reference are received.

10. The image forming apparatus according to claim 9, wherein in the mode, a correction is performed for adjusting a density of the toner image of the same color formed by another image forming units to a density of the toner image of the same color having the target density, formed by the image forming unit as the reference.

11. The image forming apparatus according to claim 10, wherein in the mode, after the inputs of the target density and the image forming unit as the reference are received, the color chart is secondarily transferred to the recording medium and output again.

12. The image forming apparatus according to claim 9, further comprising:

a detection device that detects a density of the toner image, wherein in the mode, a reference patch image of the target density formed with the toner image of the image forming unit as the reference and a target patch image of the target density formed with the toner image of another image forming unit are formed, and the detection device is caused to perform detection, a plurality of the target patch images having densities different from the target density are formed based on a density difference between the two patch images by the other image forming unit, and the detection device is caused to perform detection, and an input density of the target density in a case where the image forming section of the same color of the other image forming unit forms the toner image is replaced with an input density of the target patch image having a density closest to the reference patch image.

13. The image forming apparatus according to claim 12, wherein in the mode, a density of the target patch image is changed to reform the target patch image until a density difference between the density of the target patch image and the target patch image having the density closest to the reference patch image falls within a predetermined range.

14. The image forming apparatus according to claim 1, wherein in the mode, after the color chart is output, inputs of a target density of a target for which density is adjusted in the density of intermediate gradation of the color chart and the image forming unit as a reference are received.

15. The image forming apparatus according to claim 14, wherein in the mode, a correction is performed for adjusting a density of the toner image of the same color formed by another image forming unit to a density of the toner image of the same color having the target density, formed by the image forming unit as the reference.

16. The image forming apparatus according to claim 15, wherein in the mode, after the inputs of the target density and the image forming unit as the reference are received, the color chart is secondarily transferred to the recording medium and output again.

17. The image forming apparatus according to claim 14, further comprising:

a detection device that detects a density of the toner image, wherein in the mode, a reference patch image of the target density formed with the toner image of the image forming unit as the reference and a target patch image of the target density formed with the toner image of another image forming unit are formed, and the detection device is caused to perform detection, a plurality of the target patch images having densities different from the target density are formed based on a density difference between the two patch images by the other image forming unit, and the detection device is caused to perform detection, and an input density of the target density in a case where the image forming section of the same color of the other image forming unit forms the toner image is replaced with an input density of the target patch image having a density closest to the reference patch image.

18. The image forming apparatus according to claim 17, wherein in the mode, a density of the target patch image is changed to reform the target patch image until a density difference between the density of the target patch image and the target patch image having the density closest to the reference patch image falls within a predetermined range.

19. The image forming apparatus according to claim 1, wherein the plurality of image forming units comprise a first image forming unit and a second image forming unit, wherein each of the first image forming unit and the second image forming unit respectively has an image forming section of a predetermined color, wherein the color chart output in response to the mode being execute comprises a first patch image of the predetermined color formed by the first image forming unit and a second patch image of the predetermined color formed by the second image forming unit.

20. A non-transitory computer readable medium storing an image forming program causing a computer to execute a process comprising:

in response to an instruction to output a color chart of the same color, executing a mode in which the color chart of a toner image having a density of intermediate gradation is secondarily transferred to a recording medium and output, wherein the color chart of the toner image is formed by an image forming section of the same color of each of a plurality of image forming units.

* * * * *